US008719850B2

(12) United States Patent
Chen

(10) Patent No.: US 8,719,850 B2
(45) Date of Patent: May 6, 2014

(54) COMPACT DISC CENTERING APPARATUS OF COMPACT DISC PLAYER

(75) Inventor: Yung Ta Chen, Guangdong (CN)

(73) Assignee: Valley Wood Electrical (Shenzhen) Co., Ltd., Shenzhen, Guangdong (CN)

( * ) Notice: Subject to any disclaimer, the term of this patent is extended or adjusted under 35 U.S.C. 154(b) by 281 days.

(21) Appl. No.: 13/017,217

(22) Filed: Jan. 31, 2011

(65) Prior Publication Data

US 2011/0247024 A1    Oct. 6, 2011

(30) Foreign Application Priority Data

Mar. 31, 2010 (CN) .......................... 2010 1 0140151

(51) Int. Cl.
*G11B 17/043*    (2006.01)
(52) U.S. Cl.
USPC .......................... 720/621; 720/626; 720/624
(58) Field of Classification Search
USPC ......... 720/626, 624, 656, 645, 642, 641, 633, 720/621
See application file for complete search history.

(56) References Cited

U.S. PATENT DOCUMENTS

2005/0235300 A1* 10/2005 Kido .......................... 720/621

* cited by examiner

*Primary Examiner* — Julie Anne Watko
(74) *Attorney, Agent, or Firm* — Jackson IPG PLLC

(57) ABSTRACT

A compact disc centering apparatus of a compact disc player includes carrying rollers which are disposed within a compact disc entry on the opposite sides thereof and a compact disc guiding; a pair of detection rods capable of synchronized rotating, which is disposed between a support plate and the compact disc entry. The apparatus also includes a control device and a trigger device, wherein, an engaging portion is disposed on the control device and extends along the direction in which the control device moves, and an engaged portion is disposed on the trigger device and engages with the engaging portion. When the engaged portion is located in the engaging portion, the contact between the engaging portion and the engaged portion makes the trigger device rotate and stop at a position such that the center of the compact disc is coincident with the center of the support plate. The structure of the compact centering apparatus according to the present invention is extremely simple, which enables the center of the compact disc to stop at a position coincident with the center of the support plate, and the compact disc does not return in the direction toward the compact disc entry even if there exists the effect of a reset spring of the trigger device.

5 Claims, 6 Drawing Sheets

COMPACT DISC CENTERING APPARATUS OF COMPACT DISC PLAYER

FIELD OF THE INVENTION

The present invention relates to a compact disc centering apparatus in a compact disc player, which enables a compact disc carried through a carrying roller to a support plate to be clamped accurately.

BACKGROUND OF THE INVENTION

In a compact disc player which carries a compact disc through a carrying roller to a support plate for playing, a trigger device is usually adopted to detect whether the center of the compact arrives the center of the support plate, and actuates a clamp mechanism of the compact disc. One end of the trigger device is given a rotation force pointing to the direction of the compact disc entry under the effect of a spring, and contacts the outer circumference of the compact disc carried in the carrying path, the other end of the trigger device is pushed and rotates under the acting force against the spring, so as to actuate the clamp mechanism finally. The spring of the trigger device mentioned above may function to block the carrying of the compact disc. After the carrying roller is disengaged from the compact disc, the trigger device may return the compact disc carried on the support plate in the direction of the compact disc entry. In this way, there may be an offset between the position of the center of the compact disc and that of the support plate, so that the action of the clamp can not be performed accurately. On the other hand, after the center of the compact disc exceeds the center of the support plate by one millimeter, the outer circumference of the compact disc is in contact with the baffle on the base plate, and accordingly the carrying roller stops the carrying of the compact disc. Then, the clamp mechanism is actuated under this condition and performs the clamp action. Therefore, the clamp has been always operated in the case that the position of the center of the compact disc is inconsistent with that of the support plate.

As a method to solve the problem, a solution is proposed in Japanese Patent Application Laid-Open No. 2006-48837. In this solution, a second centering mechanism 2 is disposed between the support plate and the carrying roller, and a positioning mechanism 3 is disposed in the rear portion of the support plate. Under the combination effect of the second centering mechanism and the compact disc positioning mechanism, the whole circumference of the compact disc carried to the support plate is clamped, thereby keeping the center of the compact disc on the center position of the support plate. The addition of a plurality of parts is required in this solution, which makes the structure complicated.

SUMMARY OF THE INVENTION

The object of the invention is to provide a compact disc centering apparatus of the compact disc player in which the second centering mechanism and the compact positioning mechanism are not required to be disposed. Instead, a simple structure is used to enable the compact disc to be carried to the support plate accurately without an offset.

A compact disc centering apparatus of a compact disc player according to the invention includes:

a carrying roller which is disposed within a compact disc entry and a compact disc guide;

a pair of detection rods capable of synchronized rotating, which is disposed between a support plate and the compact disc entry;

a control device which is installed on a side of a base plate and may move in a direction parallel to a path for carrying the compact disc, this movement may actuate an action of a lifting control plate and in turn enable the support plate and the carrying roller to approach/depart from the path for carrying the compact disc; and a trigger device which is installed on the base plate and may swing, under the effect of a second spring, a contact portion on one end of the trigger device having a trend of swinging in the direction toward the compact disc entry, and the trigger device being for actuating an initial movement of the control device such that the control device may be drove by a motor; wherein, an engaging portion is disposed on the control device and extends along the direction in which the control device moves, and an engaged portion is disposed on the trigger device and engages with the engaging portion;

when the engaged portion is located in the engaging portion, the contact between the engaging portion and the engaged portion makes the trigger device rotate and stop at a position such that the center of the compact disc is coincident with that of the support plate.

In the present invention, the engaging portion may also be disposed on the trigger device and extends along the direction in which the control device moves, and the engaged portion is disposed on the control device and engages with the engaging portion.

The present invention further provides a trigger mechanism capable of preventing a center of a compact disc from deviating from a center of a support plate, including:

a control device which is installed on a side of a base plate and may move in a direction parallel to a path for carrying the compact disc, an engaging portion being disposed on the control device and extending along the direction in which the control device moves; and a trigger device which is adapted to supply the power for an initial movement of the control device and is installed on the base plate through a middle axis, a contact portion to be in contact with an outer circumference of the compact disc being disposed on one end of the trigger device, and the engaged portion for engaging with the engaging portion being disposed on the other end, the trigger device being given, by a second spring, a rotation force which makes the contact portion of the trigger device tend to the direction of the compact disc entry.

When the engaged portion is located in the engaging portion, the contact between the engaging portion and the engaged portion makes the trigger device rotate and stop at a position such that the center of the compact disc is coincident with that of the support plate.

The structure of the compact centering apparatus according to the present invention is extremely simple in that only an engaging portion is disposed on the control device and extends along the direction in which the control device moves, and an engaged portion is disposed on the trigger device and engages with the engaging portion. In addition, when the engaged portion is located in the engaging portion, the contact between the engaging portion and the engaged portion makes the trigger device rotate and in turn makes the center of the compact disc stop at a position coincident with the center of the support plate. The compact disc carried to the support plate in this manner does not return in the direction of the compact disc entry even if there exists the effect of a reset spring of the trigger device.

Furthermore, in the present invention, a slide plate is provided with a L-shaped arbor hole and the base plate is provided with a guiding hole, so as to form a pivot changing mechanism of the trigger device. When a large diameter compact disc is carried in, an overlapped part of the L-shaped arbor hole and the guiding hole is changed such that the pivot of the trigger device moves to another position to be adapted to the detection of the position of the large diameter compact disc.

DETAILED DESCRIPTION OF THE EMBODIMENTS

A long hole extending along the direction in which the control device moves is disposed on the control device, and a protrusion to be tabled with the long hole is disposed on the trigger device. The tabling of the long hole and the protrusion makes the end of the trigger device stop at a position such that the center of the compact disc is coincident with that of the support plate. Next, the present invention will be further described with reference to FIGS. 1-12 and the embodiments.

Figure 1:
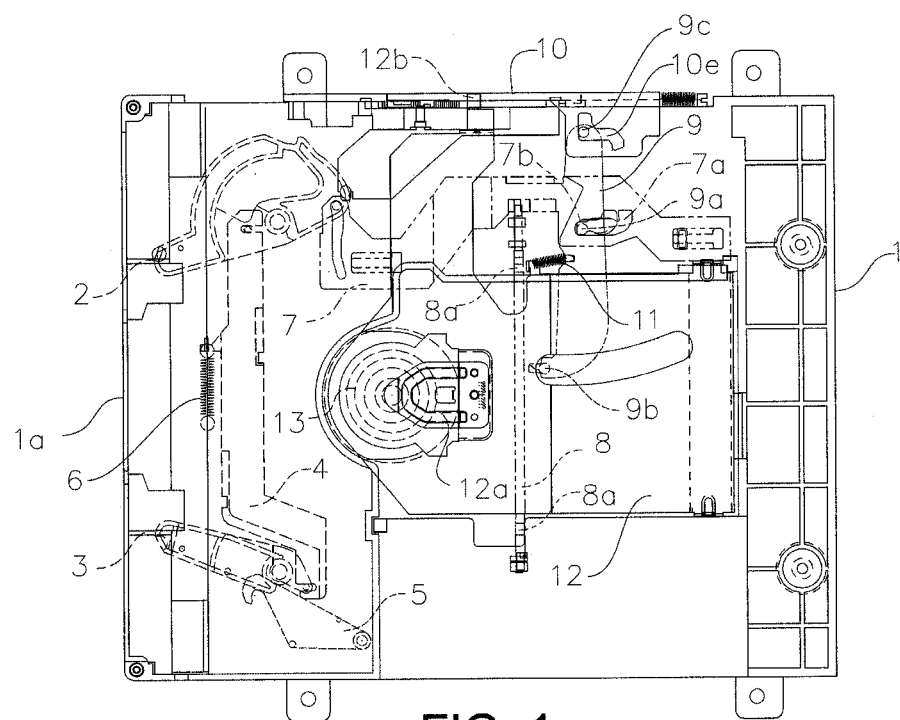
FIG. 1 is a plan view of the compact disc player according to the present embodiment.
Figure 2:
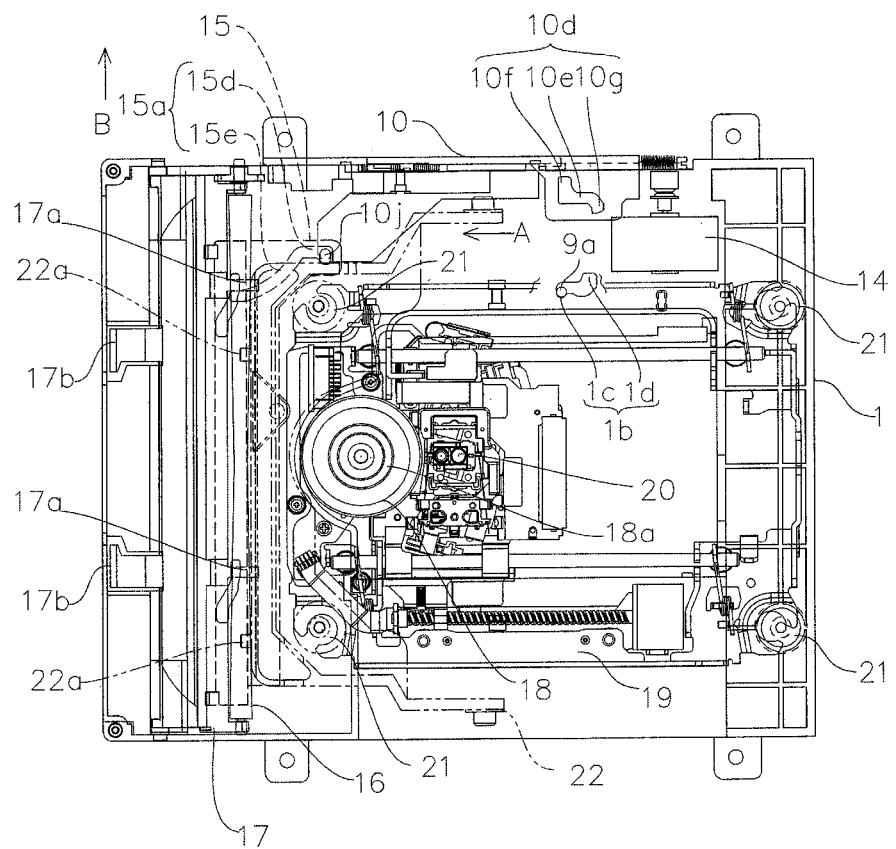
FIG. 2 is a plan view of the compact disc player according to the present embodiment.

FIG. 1 is a first top plan view of a compact disc player which is provided with a compact disc centering apparatus according to the present invention, and FIG. 2 is a second top plan view thereof. A compact disc entry 1a is disposed on the left side of a base plate 1 of the compact disc player and a pair of detection rods 2, 3 is disposed between the compact disc entry 1a and a support plate 18. The pair of detection rods 2, 3 may be in contact with the outer circumference of the compact disc inserted from the compact disc entry 1a. In addition, the detection rod 2 on one side is associated with the detection rod 3 on the other side through a connection plate 4. The linkage may be realized between the detection rods 2 and 3, i.e., if the detection rod 2 on one side rotates clockwise, then the detection rod 3 on the other side rotates counterclockwise. In addition, a hook rod 5 is disposed near the detection rod 3 on the other side. This hook rod 5 may keep the detection rods 2, 3 stop at a position after rotation when a large diameter compact disc is inserted from the compact disc entry 1a. A first spring 6 is hitched between the connection plate 4 and the base plate 1. The pair of detection rods 2, 3 is given a rotation force by the first spring 6, and the rotation force enable the rotation ends of the pair of detection rods 2, 3 to rotate toward the direction in which the compact disc entry 1a is closed. When the compact disc is inserted into the compact disc entry 1a deviating from the center line of the path for carrying the compact disc, its outer circumference may contact one of the two detection rods. Under the pressure of this detection rod, the compact disc in carrying may be regulated gradually to move along the center line of the path for carrying the compact disc. Furthermore, the pair of detection rods is also adapted to detect the outer diameter of the compact disc being carried in order to control transition of the positions of the small diameter compact disc guide 8, the trigger device 9 and so on, such that both the small and large diameter compact discs can be recognized.

Figure 3:
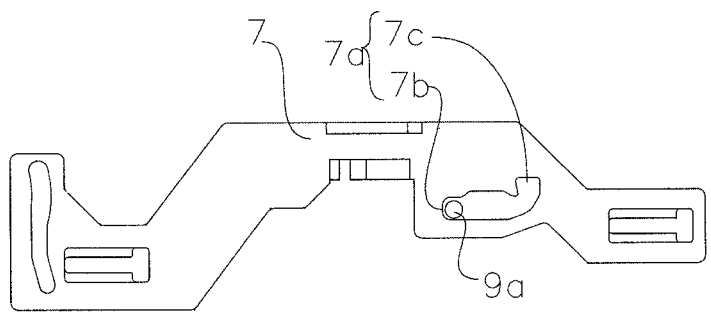
FIG. 3 is a plan view of the slide plate of the compact disc player.
Figure 4:
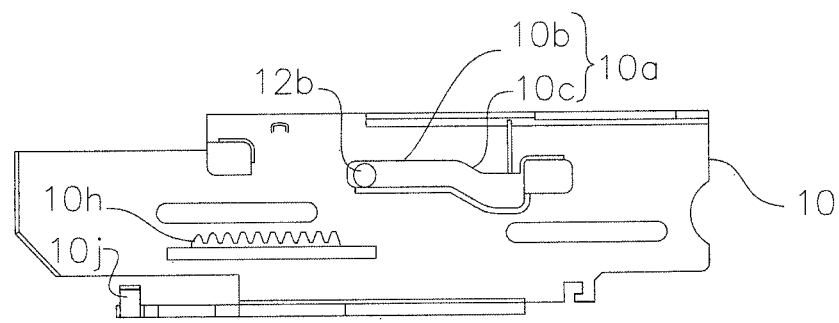
FIG. 4 is a side view of the control device of the compact disc player.

The detection rod 2 on one side is connected to the slide plate 7, and the slide plate 7 is adapted to control the small diameter compact disc guiding 8 to leave the path for carrying the compact disc and the trigger device 9 to change its divot when a large diameter compact disc is carried in. If the detection rod 2 starts to rotate from an initial position, the slide plate 7 moves in the direction toward the compact disc entry 1a. The central part of the slide plate 7, as shown in FIG. 3, has a stirring portion 7e adapted to stir the small diameter compact disc guiding 8 to rotate. The stirring portion 7e engages with one end of the rod-like small diameter compact disc guiding 8. The small diameter compact disc guiding 8 is installed on the base plate 1 and may rotate. Two guiding sheets 8a protruding into the path for carrying the compact disc are disposed on the small diameter compact disc guiding 8. The small diameter compact disc guiding 8 directs the center of the small diameter compact disc to the position of the center of the support plate 18 through the guiding sheets 8a. If the slide plate 7 moves in the direction toward the compact disc entry 1a, the slide plate 7 makes the small diameter compact disc guiding 8 rotate and in turn makes the guiding sheets 8a leave the path for carrying the compact disc. The slide plate 7 is also provided with a guiding portion 7d for determining the moving direction of the slide plate. The slide plate 7 is further provided with a fourth cam-shaped groove 7f for cooperating with the detection rod 2 to make this slide plate 7 approach or depart from the compact disc entry 1a when the detection rod 2 is rotating. Also, the slide plate 7 has a L-shaped arbor hole 7a which is tabled with a middle axis 9a of the trigger device (or trigger arm) 9. This arbor hole 7a has a first middle portion extending along the direction in which the slide plate 7 moves and two ends, wherein the first end 7b has the same width as the diameter of the middle axis 9a, the first middle portion has a width slightly larger than the diameter of the middle axis 9a, and at the second end, a first concave portion 7c is formed along the direction perpendicular to the direction in which the slide plate 7 moves.

On the other hand, as shown in FIG. 2, on the top surface of the base plate 1, a guiding hole 1b which enables the middle axis 9a to be tabled is formed in a position overlapped with the arbor hole 7a. The guiding hole 1b also has a shape extending along the direction in which the slide plate 7 moves. The guiding hole has a second middle portion extending along the direction in which the slide plate 7 moves. At one end of the second middle portion, a second concave portion 1c is formed along the direction perpendicular to the direction in which the slide plate 7 moves. At the other end of the second middle portion, a third concave portion 1d is formed along the direction perpendicular to the direction in which the slide plate 7 moves. The guiding hole 1b and the L-shaped arbor hole 7a constitute a pivot changing mechanism of the trigger device 9.

When a small diameter compact disc is carried in, the second concave portion 1c and the first end 7b of the arbor hole 7a overlap, and the middle axis 9a of the trigger device 9 is embedded in the second concave portion 1c; When a large diameter compact disc is carried in, the slide plate 7 moves toward the compact disc entry 1a under the stirring of the detection rod 2, such that the third concave portion 1d and the first concave portion 7c overlap, and the middle axis 9a of the trigger device 9 is embedded in the first concave portion 7c under the push of the outer circumference of the compact disc.

One end of the trigger device 9 is provided with a contact portion 9b which contacts the outer circumference of the compact disc, and the other end is provided with an engaged portion 9c. In the Figure, a cylindrical protrusion is adopted as the engaged portion 9c. The optical disc moves within the carry path. When its circumference contacts the contact portion 9b and pushes the trigger device 9 to rotate around the middle axis 9a, the control device 10 installed on the side of the base plate 1 is pushed in the direction toward the compact disc entry 1a. In addition, a second spring 11 is hitched between the trigger device 9 and a clamp arm 12 (i.e., a support device of the clamp), which gives the trigger device 9b a rotation force pointing to the direction of the compact disc entry. In addition, the trigger device 9b is approximately disposed at a position in which the trigger device 9b may rotate at the center of the carry path.

When no compact disc is inserted, the middle axis 9a of the trigger device 9 is tabled with the second concave portion 1c, the first end 7b of the arbor hole 7a on the slide plate 7 is tabled with the middle axis 9a, and the middle axis 9a may rotate around the second concave portion 1c as a center. On the other hand, when a large diameter compact disc is inserted, the slide plate 7 moves in the direction toward the compact disc entry 1a, then the middle axis 9a departs from the second concave portion 1c of the guiding hole 1b through the first middle portion of the arbor hole 7a, and rotates around the engaged portion 9c as a center. In addition, in the case where the middle axis 9a rotates around the engaged portion 9c as a center, if the middle axis 9a arrives at the first concave portion 7c and the third concave portion 1d, the trigger device 9 may rotate around the first and third concave portions 7c and 1d as a center.

The clamp arm 12 is installed on the base plate 1 through an axis on one end thereof and may rotate freely. The other end of the clamp arm 12 has a clamp 13. The clamp 13 functions to hold the compact disc carried on the support plate 18, therefore, there is a plate spring 12a disposed on the clamp arm 12, which may give the clamp a push pressure. In addition, clamp arm 12 has a cam slave 12b which may be tabled with the cam-shaped hole 10a of the control device 10. The cam-shaped hole 10a of the control device 10 is made up of a straight part 10b extending along the direction in which the control device 10 moves and an inclined part 10c. When the control device 10 moves to the terminal in the direction toward the compact disc entry 1a, the cam slave 12b is tabled with the inclined part 10c of the cam-shaped hole 10a, such that the clamp 13 falls on the support plate 18.

Figure 5:
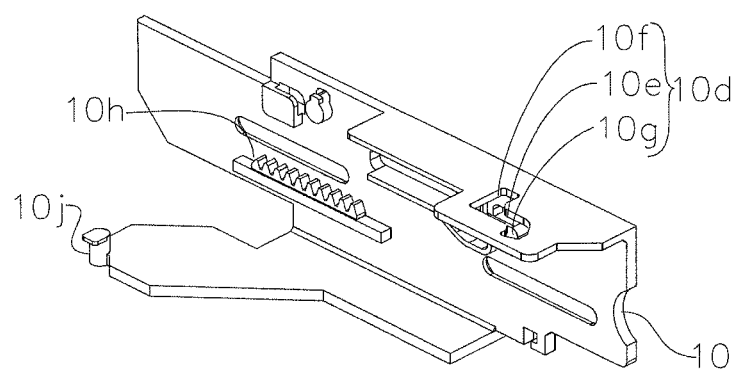
FIG. 5 is a stereogram of the control device of the compact disc player.

The control device 10 is installed on the side of the base plate 1 and may move approaching or departing from the compact disc entry 1. As shown in FIG. 5, the control device 10 has an upright plate, as well as a top plate and a bottom plate which extend toward the inside from the upper and lower edges of the upright plate, respectively. The top plate has a tabling hole 10d which may be tabled with the engaged portion 9c of the trigger device 9, the upright plate has a rack 10h and a cam-shaped hole 10a for controlling the lifting of the clamp 13, and the bottom plate has a first protrusion 10j for actuating the lifting control plate 15 to move. The tabling hole 10d is made up of an engaging portion (a long hole is adopted here) 10e extending along the direction in which the control device 10 moves, a first slot 10f which is substantially perpendicular to one end of the engaging portion 10e, and a second slot 10g which is substantially perpendicular to the other end of the engaging portion 10e. The tabling hole 10d has a shape of letter Z approximately. The engaging portion (i.e., the long hole) 10e is configured to have a width slightly larger than the diameter of the engaged portion 9c. The engaging portion 10e is positioned such that when the control device 10 moves under the force of a motor, the engaged portion 9c is tabled with the engaging portion 10e and the contact portion 9b of the trigger device 9 may push the compact disc to a position in which the center of the compact disc is coincident with that of the support plate 18. After the control device 10 initially moves in the direction toward the compact disc entry 1a under the rotation force of the trigger device 9, the rack 10h engages with the gear (not shown in the Figure) rotating under the effect of the motor 14, thus, the control device 10 moves in the direction toward the compact disc entry 1a under the power effect of the motor 14. As shown in FIG. 2, the first protrusion 10j may be tabled with the first cam-shaped groove 15a of the lifting control plate 15.

Figure 7:
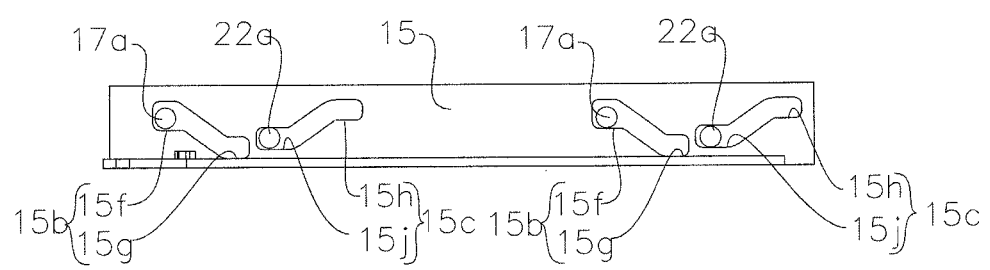
FIG. 7 is a rear view of the lifting control plate of the compact disc player.

A carrying roller 16 for carrying the compact disc and a roller arm 17 which supports the carrying roller and enables the carrying roller to rotate freely and also may enable the carrying roller to leave the surface of the compact disc freely are installed near the compact disc entry 1a on the underside of the base plate 1. The roller arm 17 may rotate freely relative to the base plate 1. As shown in FIGS. 2 and 7, the roller arm 17 is provided with a second protrusion 17a which is tabled with the second cam-shaped groove 15b of the lifting control plate 15. Also, a locking sheet 17b is formed integrally on the roller arm 17 for locking the compact disc entry 1a when the carrying roller leaves the surface of the compact disc. In this way, when a rotation force of the motor 14 is transmitted to the carrying roller 16, the compact disc is clamped between the carrying roller 16 and a compact disc guiding plate (which is installed on the other side of the compact disc entry 1a opposite to the carrying roller, not shown in the Figure), and the compact disc is carried to the carrying path along with the rotation of the carrying roller 16.

On the other hand, a beam mechanism 19 having the support plate 18 is configured below the clamp 13. The beam mechanism 19 is provided with an extraction apparatus 20 for reading the signal of the compact disc on the support plate 18, one end of which is mounted on the base plate 1 through a rubber baffle 21, and the other end is mounted on the lifting rod 22 through the rubber baffle 21. One end of the lifting rod 22 is installed on the base plate 1 through an axis and may rotate freely, and the other end, as shown in FIG. 7, has a third protrusion 22a which engages with the third cam-shaped groove 15c of the lifting control plate 15.

Figure 6:
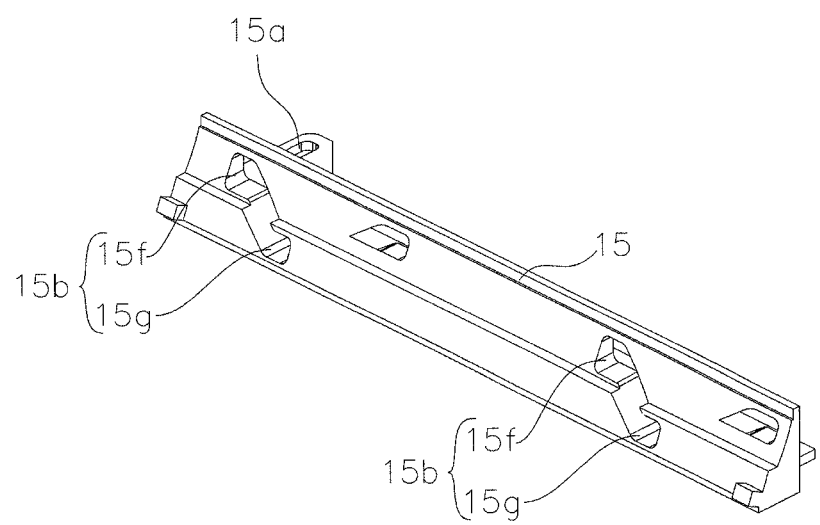
FIG. 6 is a stereogram of the lifting control plate of the compact disc player.

As shown in FIG. 6, the lifting control plate 15 has a strip shape, its upright plate has the second cam-shaped groove 15b for actuating the lifting of the carrying roller 16 and the third cam-shaped groove 15c for actuating the lifting of the support plate 18, and a projecting edge on its bottom has the first cam-shaped groove 15a, which cooperates with the first protrusion 10j for actuating the lifting control plate 15 to move along the direction parallel to the axis of the carrying roller. As shown in FIG. 2, the strip-shaped lifting control plate 15 is parallel to the carrying roller 16.

As shown in FIG. 2, the first cam-shaped groove 15a of the lifting control plate 15 is made up of a short straight part 15d and a bended part 15e extending from the short straight part 15d. The initial movement of the control device 10 may not be blocked when the first protrusion 10j passes through the straight part 15d. The bended part 15e is configured such that when the control device 10 moves under the power effect of the motor, if the first protrusion 10j moves in the direction of the arrow A and engages with the bended part 15e, then the control device 10 enables the lifting control plate 15 to move in the direction of the arrow B.

As shown in FIG. 7, the second cam-shaped groove 15b of the lifting control plate 15 is made up of the upper straight part 15f and the lower straight part 15g which are parallel to the direction in which the lifting control plate 15 moves, as well as an inclined part which connect the two straight parts 15f and 15g. When the second protrusion 17a is tabled with the upper straight part 15f, the second cam-shaped groove 15b turns the roller arm 17 such that the carrying roller 16 rotates to a position in which the carrying roller 16 is in contact with the surface of the compact disc. When the second protrusion 17a is tabled with the lower straight part 15f, the roller arm 17 is turned such that the carrying roller 16 rotates to a position in which the carrying roller 16 departs from the surface of the compact disc.

The third cam-shaped groove 15c is also made up of the upper straight part 15h and the lower straight part 15j which are parallel to the direction in which the lifting control plate 15 moves, as well as an inclined part which connect the two straight parts 15h and 15j. When the third protrusion 22a is tabled with the upper straight part 15h, the lifting rod 22 is turned such that the beam mechanism 19 is lifted to a position in which the compact disc may be clamped by the support plate 18 and the clamp 13. When the third protrusion 22a is tabled with the lower straight part 15j, the lifting rod 22 is turned such that the beam mechanism 19 is fallen down and the support plate 18 departs from the path for carrying the compact disc.

Next, the process for carrying the compact disc will be described.

Figure 8:
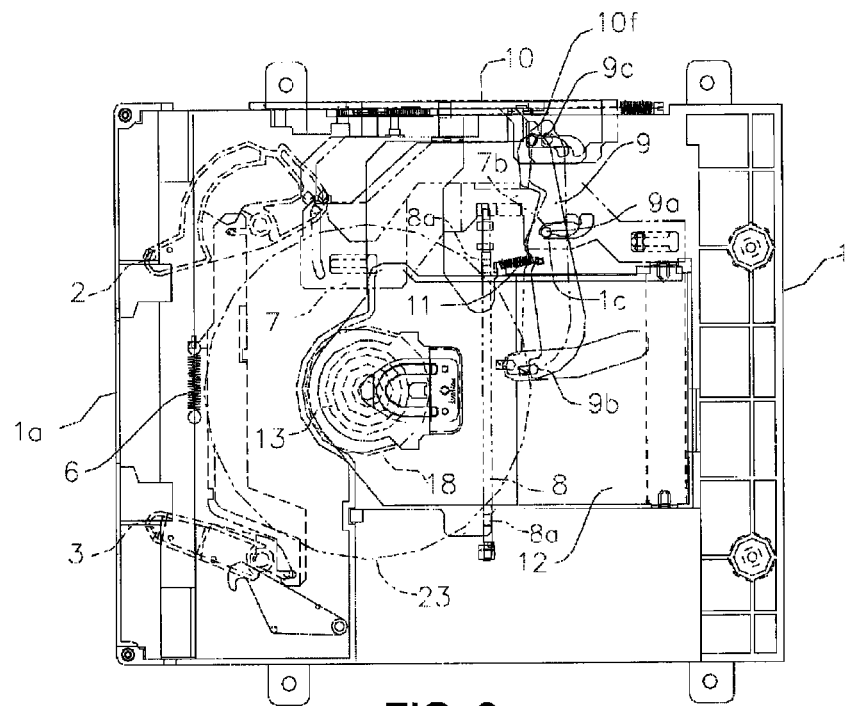
FIG. 8 is a diagram of the state in which a small diameter compact disc is carried on the support plate.

FIG. 8 illustrates a state in which the center of a small diameter compact disc 23 is carried to the position of the center of support plate 18 through the guidance of the guiding sheet 8a. Here, the detection rod 2 on one side is located in an initial position and the slide plate 7 may not move in the direction toward the compact disc entry 1a. Therefore, the middle axis 9a of the trigger device 9 is tabled with the second concave portion 1c, and the trigger device 9 rotates from the position indicated by the dot dash line to the position indicated by the solid line around the second concave portion 1c as a center. On the other hand, the contact portion 9b of the trigger device 9 pushes back the small diameter compact disc 23 in the direction toward the compact disc entry 1a under the pull of the second spring 11. However, since a carrying force is applied by the carrying roller 16, the small diameter compact disc 23 will not be pushed back by the effect of the second spring 11. In addition, since the trigger device 9 has moved to the position indicated by the solid line, the engaged portion 9c enables the control device 10 to move toward the compact disc entry 1a. The control device 10 is then pushed from the position indicated by the dot dash line to the position indicated by the solid line. In this way, the power of the motor 14 is transmitted to the control device 10 through the rack 10h, and the control device 10 starts to move under the power of the motor 14.

Figure 9:
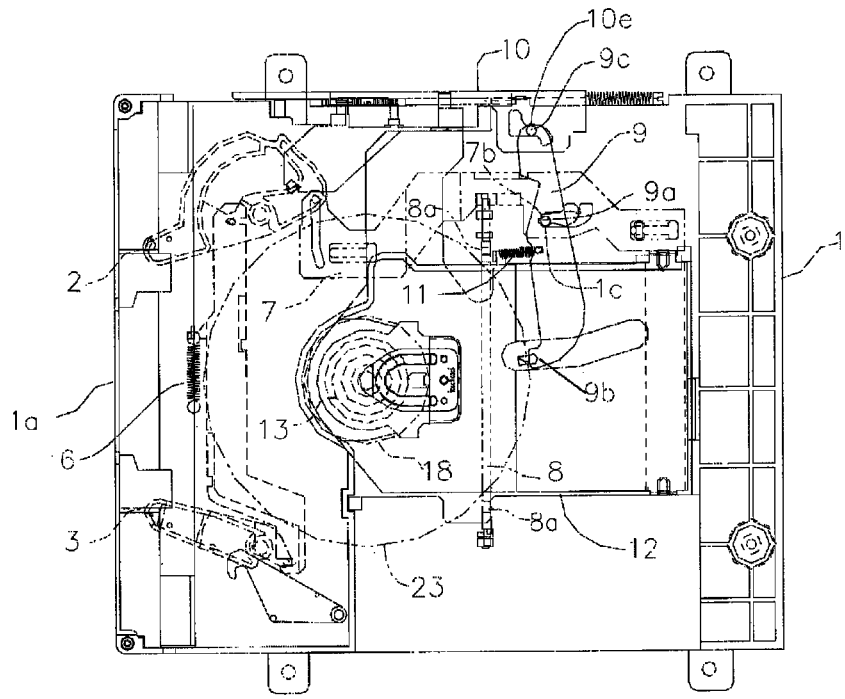
FIG. 9 is a diagram of the state in which a small diameter compact disc is carried on the support plate.

FIG. 9 illustrates the state in which the control device 10 moves under the power effect of the motor. Here, the engaged portion 9c of the trigger device 9 is tabled in the engaging portion 10e. The contact portion 9b of the trigger device 9 prevents the center of the small diameter compact disc 23 subjected to the effect of the carrying force of the carrying roller from exceeding the center of support plate through this tabling. On the other hand, during this period, under the power of the motor, the control device 10 continues to move in the direction toward the compact disc entry 1a, the first protrusion 10j of the control device 10 implements the slip connection with the bended part 15e of the first cam-shaped groove 15a (see FIG. 2), and the lifting control plate 15 starts to move in the direction indicated by the arrow B. The carrying roller 16 starts to depart from the surface of the compact disc due to the movement of the lifting control plate 15. In addition, the lifting rod 22 lifts the support plate 18 toward the surface of the compact disc. It is well known that a core cylinder 18a to be tabled with the center hole of the compact disc is formed on the support plate, and this core cylinder 18a is tabled with the center hole of the compact disc in the state that the support plate 18 is lifted. After the core cylinder 18a is embedded into the center hole of the compact disc, movement of the compact disc in any direction will be limited by the core cylinder 18a.

Figure 10:
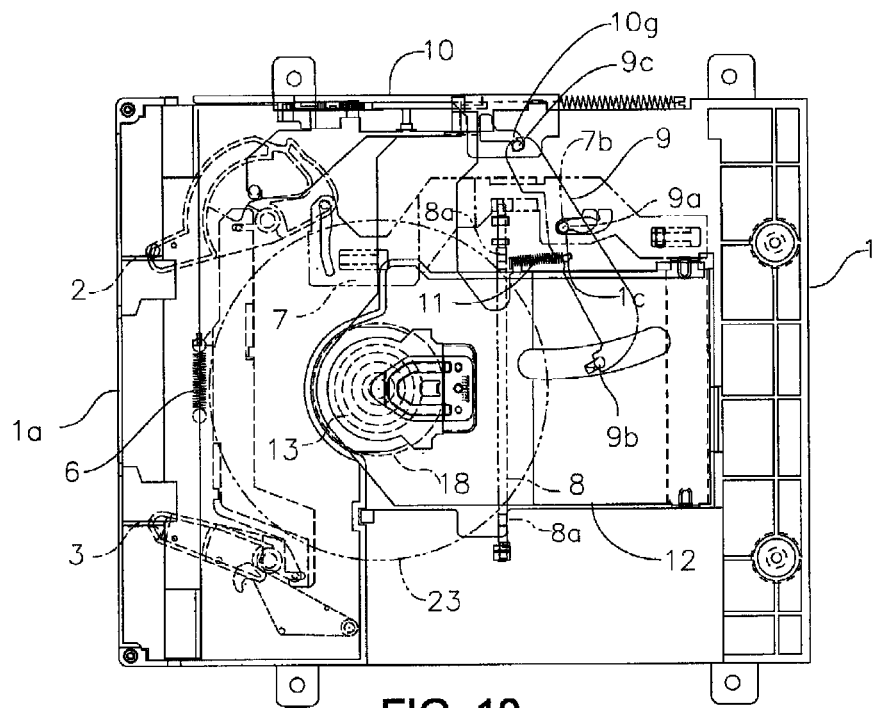
FIG. 10 is a diagram of the state in which a small diameter compact disc is placed on the support plate.

FIG. 10 illustrates the state after the movement of the control device 10 caused by the effect of the motor ends. Here, the engaged portion 9c of the trigger device 9 is located in the second slot 10g, the trigger device 9 is pushed by the control device 10 and rotates counter-clockwise around the middle axis 9a as a center. The contact portion 9b departs from the outer circumference of the small diameter compact disc due to this rotation. On the other hand, the lifting control plate 15 arrives at the terminal of the movement in the B direction, and the second protrusion 17a is embedded in the lower straight part 15g of the second cam-shaped groove 15b to turn the roller arm 17, such that the carrying roller 16 departs from the small diameter compact disc 23. In addition, the third protrusion 22a of the lifting rod 22 is tabled with the upper straight part 15h of the third cam-shaped groove 15c, such that the beam mechanism is lifted to a position in which the small diameter compact disc may be clamped by the support plate 18 and the clamp 13. Furthermore, under the effect of the inclined part 10c of the cam-shaped hole 10a of the control device 10, the clamp arm 12 pushes the cam slave 12b such that the clamp 13 falls on the support plate 18. The clamp 13 holds the small diameter compact disc on the support plate 18 through the elasticity of the plate spring 12a. At this time, the small diameter compact disc 23 may be played.

As described above, before the small diameter compact disc 23 is clamped on the support plate 18 by the clamp 13, since the cylindrical protrusion (i.e., the engaged portion 9c) of the trigger device 9 is embedded in the long hole (i.e., the engaging portion 10e), the center of the small diameter compact disc 23 subjected to the effect of the carrying force of the carrying roller may be prevented from exceeding the center of the support plate 18 through the contact portion 9b of the trigger device, and the small diameter compact disc 23 subjected to the effect of the second spring 11 may also be prevented from pushing to the compact disc entry 1a by the trigger device 9.

Figure 11:
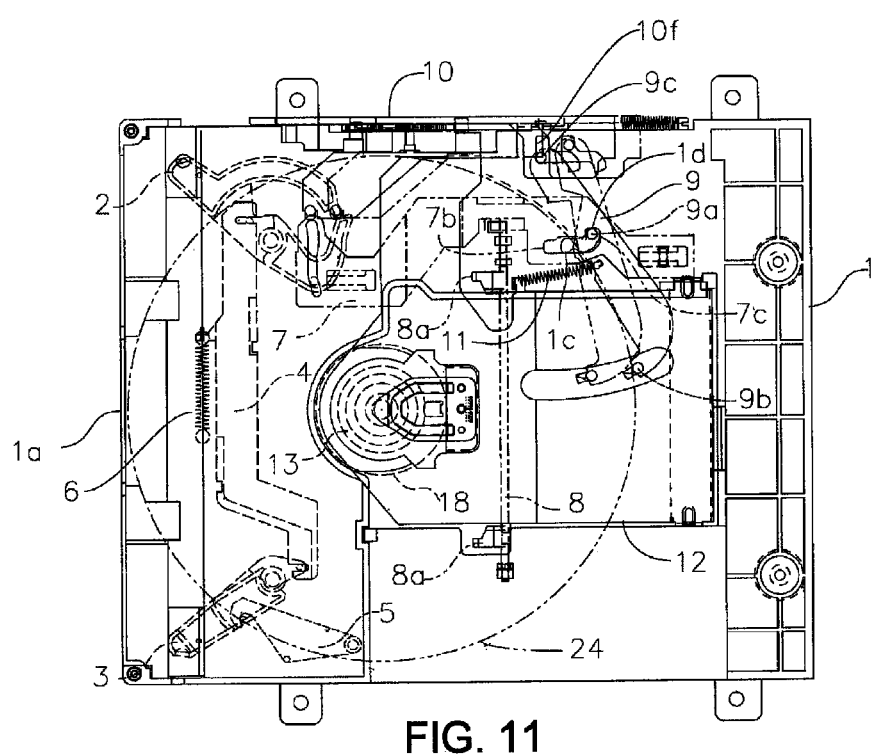
FIG. 11 is a diagram of the state in which a large diameter compact disc is carried on the support plate.

FIG. 11 illustrates a state in which the center of a large diameter compact disc 24 is carried to the center of support plate 18. Here, the pair of detection rods 2, 3 is pushed and pressed by a large diameter compact disc 24 so as to rotate largely, and stops at a position after the rotation under the effect of the hook rod 5. In addition, the slide plate 7 moves in the direction toward the compact disc entry 1a along with the rotation of the detection rod 2. After that, the middle portion of the slide plate 7 engages with one end of the small diameter compact disc guiding 8, such that the small diameter compact disc guiding 8 rotates and the guiding sheet 8a leaves the path for carrying the compact disc. Also, the middle axis 9a is allowed to pass through the first middle portion of the arbor hole 7a on the slide plate 7, which allows the trigger device 9 to rotate around the engaged portion 9c as a center. Because of this rotation, the middle axis 9a of the trigger device 9 is tabled with the first concave portion 7c and the third concave portion 1d indicated by the dot dash lines, at the same time, the position of the contact portion 9b backs off largely relative to the case in which the small diameter compact disc is carried in.

Here, the contact portion 9b of the trigger device 9 pushes the large diameter compact disc 24 toward the compact disc entry 1a under the pull of the second spring 11. However, since a carrying force is applied by the carrying roller 16, the large diameter compact disc may not be returned by the second spring. In addition, since the trigger device 9 rotates to the position indicated by the solid line, the engaged portion 9c enables the control device 10 to move in the direction toward the compact disc entry 1a, such that the control device 10 is pushed from the position indicated by the dot dash line to the position indicated by the solid line. In this way, the power of the motor 14 is transmitted to the control device 10 through the rack 10h, and the control device 10 starts to move under the power of the motor 14.

Figure 12:
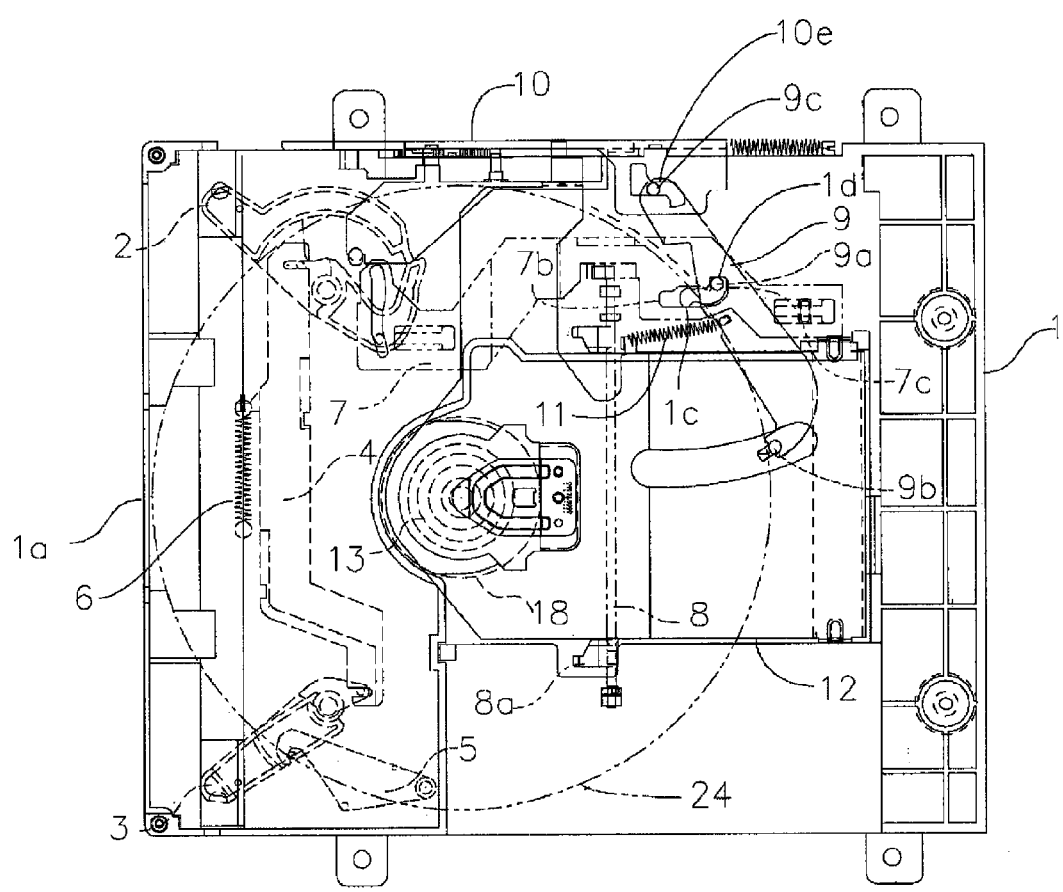
FIG. 12 is a diagram of the state in which a large diameter compact disc is carried on the support plate.

FIG. 12 illustrates the state in which the control device 10 moves under the power effect of the motor. Here, the engaged portion 9c of the trigger device 9 is tabled in the engaging portion 10e. The contact portion 9b of the trigger device 9 prevents the center of the large diameter compact disc 24 subjected to the effect of the carrying force of the carrying roller from exceeding the center of support plate 13 through this tabling. On the other hand, during this period, the control device 10 continues to move in the direction toward the compact disc entry 1a under the power of the motor 14, the first protrusion 10j of the control device 10 implements the slip connection with the bended part 15e of the first cam-shaped groove 15a (see FIG. 2), such that the lifting control plate 15 starts to move in the direction indicated by the arrow B. The carrying roller 16 starts to depart from the surface of the compact disc due to the movement of the lifting control plate 15. In addition, the lifting rod 22 lifts the support plate 18 toward the surface of the compact disc. After the core cylinder 18a of the support plate 18 is embedded into the center hole of the compact disc, movement of the compact disc in any direction will be limited by the core cylinder 18a. Then in the same manner as the small diameter compact disc, the clamp mechanism is started and the large diameter compact disc 24 may be played.

In the above embodiment, the engaged portion 9c—cylinder protrusion is disposed on the trigger device 9 and the engaging portion 10e—long hole is disposed on the control device 10. However, it is not limited to this actually. The long hole may also be disposed on the trigger device 9 and the protrusion may be disposed on the control device 10. In either case described above, when the engaged portion is located inside the engaging portion, the trigger device rotates to a position such that the center of the compact disc is coincident with that of the support plate under the effect of the engaging portion and the engaged portion. Therefore, after the compact disc is carried on the support plate, the compact disc may not be returned even if a force pointing to the compact disc entry is applied to the compact disc by the trigger device under the effect of the second spring. Also, under the effect of the end of the trigger device, the center of the compact disc carried by the carrying roller will stop at the position which is coincident with the center of the support plate.

Therefore, the compact disc may be clamped accurately by only using this simple structure in which the engaging portion is disposed on the control device and the engaged portion which engages with the engaging portion is disposed on the trigger device.

The control device 10 and trigger device 9 according to the above embodiments constitutes a trigger mechanism. When the compact disc is carried to a position in which the center of the compact disc is coincident with that of the support plate, the trigger mechanism is adapted to start the clamp and the support plate to clamp the compact disc, and enable the carrying roller to depart from the compact disc and in turn leave the path for carrying the compact disc. Such configuration of the engaging portion and the engaged portion enables the trigger mechanism to prevent the enter of the compact disc from deviating from the center of the support plate, therefore, the compact disc may be clamped accurately by the support plate and the clamp. Such trigger mechanism may be applied to not only the compact disc player according to the above embodiments, but also to other players which adopts the roller to carry the compact disc.

The invention claimed is:

1. A compact disc centering apparatus of a compact disc player, comprising:
    a carrying roller which is disposed within a compact disc entry and a compact disc guide;
    a first spring hitched between a connection plate and a base plate;
    a pair of detection rods that rotate opposite each other in synchronization, which is disposed between a support plate and the compact disc entry;
    a control device which is installed on a side of the base plate and may move in a direction parallel to a path for carrying the compact disc, said movement causing a lifting control plate to move which in turn enables the support plate and the carrying roller to approach/depart from the path for carrying the compact disc; and
    a trigger device which is installed on the base plate and is configured to swing, under the effect of a second spring, a contact portion on one end of the trigger device having a trend of swinging in the direction toward the compact disc entry, and the trigger device being for actuating an initial movement of the control device such that the control device may be driven by a motor;
    wherein, an engaging portion is disposed on the control device and extends along a direction in which the control device moves, and an engaged portion is disposed on the trigger device and engages with the engaging portion;
    or, an engaging portion is disposed on the trigger device and extends along a direction in which the control device moves, and an engaged portion is disposed on the control device and engages with the engaging portion;
    wherein the engaging portion is a hole and the engaged portion is a protrusion capable of being embedded in the hole;
    when the engaged portion is located in the engaging portion, the contact between the engaging portion and the engaged portion makes the trigger device rotate and stop the compact disc at a position such that the center of the compact disc is coincident with that of the support plate.

2. The compact disc centering apparatus according to claim 1,
    wherein a first slot which is substantially perpendicular to the hole is disposed on one end of the hole, and a second slot which is substantially perpendicular to the hole is disposed on the other end of the hole, the hole, the first slot and the second slot form a tabling hole having a shape of letter Z.

3. A compact disc centering apparatus of a compact disc player, comprising:
- a carrying roller which is disposed within a compact disc entry and a compact disc guide;
- a first spring hitched between a connection plate and a base plate;
- a pair of detection rods that rotate opposite each other in synchronization, which is disposed between a support plate and the compact disc entry;
- a control device which is installed on a side of the base plate and may move in a direction parallel to a path for carrying the compact disc, said movement causing a lifting control plate to move which in turn enables the support plate and the carrying roller to approach/depart from the path for carrying the compact disc;
- wherein the control device has an upright plate, as well as a top plate and a bottom plate which extend toward the inside from the upper and lower edges of the upright plate, respectively, the top plate has the engaging portion or the engaged portion, the upright plate has a rack and a cam-shaped hole for controlling the lifting of a clamp, and the bottom plate has a first protrusion for actuating the lifting control plate to move; and
- a trigger device which is installed on the base plate and is configured to swing, under the effect of a second spring, a contact portion on one end of the trigger device having a trend of swinging in the direction toward the compact disc entry, and the trigger device being for actuating an initial movement of the control device such that the control device may be driven by a motor;
- wherein, an engaging portion is disposed on the control device and extends along a direction in which the control device moves, and an engaged portion is disposed on the trigger device and engages with the engaging portion;
- or, an engaging portion is disposed on the trigger device and extends along a direction in which the control device moves, and an engaged portion is disposed on the control device and engages with the engaging portion;
- when the engaged portion is located in the engaging portion, the contact between the engaging portion and the engaged portion makes the trigger device rotate and stop the compact disc at a position such that the center of the compact disc is coincident with that of the support plate.

4. The compact disc centering apparatus according to claim 3,
- wherein the lifting control plate is parallel to the carrying roller and has a strip shape, its upright plate has a second cam-shaped groove for actuating the lifting of the carrying roller and a third cam-shaped groove for actuating the lifting of the support plate, its bottom has a first cam-shaped groove, and the first cam-shaped groove cooperates with the first protrusion for actuating the lifting control plate to move along the direction parallel to the axis of the carrying roller.

5. A compact disc centering apparatus of a compact disc player, comprising:
- a carrying roller which is disposed within a compact disc entry and a compact disc guide;
- a first spring hitched between a connection plate and a base plate;
- a pair of detection rods that rotate opposite each other in synchronization, which is disposed between a support plate and the compact disc entry;
- a control device which is installed on a side of the base plate and may move in a direction parallel to a path for carrying the compact disc, said movement causing a lifting control plate to move which in turn enables the support plate and the carrying roller to approach/depart from the path for carrying the compact disc;
- a trigger device which is installed on the base plate and is configured to swing, under the effect of a second spring, a contact portion on one end of the trigger device having a trend of swinging in the direction toward the compact disc entry, and the trigger device being for actuating an initial movement of the control device such that the control device may be driven by a motor; and
- a pivot changing mechanism of the trigger device, wherein the pivot changing mechanism comprises:
  - a L-shaped arbor hole on a slide plate, the arbor hole having a first middle portion which extends along the moving direction of the slide plate and of which the width is slightly larger than a diameter of the middle axis of the trigger device, and the L-shaped arbor hole has two ends,
  - wherein the first end has the same width as the diameter of the middle axis, and a first concave portion is formed on the second end along the direction perpendicular to the direction in which the slide plate moves; and
  - a guiding hole on the base plate, the guiding hole comprising:
    - a second middle portion extending along the direction in which the slide plate moves, a second concave portion and a third concave portion formed on the two ends of the second middle portion along the direction perpendicular to the direction in which the slide plate moves;
  - wherein when a small diameter compact disc is carried in, the second concave portion and the first end of the arbor hole overlap, the middle axis of the trigger device is embedded in the second concave portion;
  - when a large diameter compact disc is carried in, the slide plate moves toward the compact disc entry under stirring of the detection rod, such that the third concave portion and the first concave portion overlap, and the middle axis of the trigger device is embedded in the first concave portion under a push of the outer circumference of the compact disc;
- wherein, an engaging portion is disposed on the control device and extends along a direction in which the control device moves, and an engaged portion is disposed on the trigger device and engages with the engaging portion;
- or, an engaging portion is disposed on the trigger device and extends along a direction in which the control device moves, and an engaged portion is disposed on the control device and engages with the engaging portion;
- when the engaged portion is located in the engaging portion, the contact between the engaging portion and the engaged portion makes the trigger device rotate and stop the compact disc at a position such that the center of the compact disc is coincident with that of the support plate.

* * * * *